United States Patent Office 3,694,183
Patented Sept. 26, 1972

3,694,183
PROCESS FOR CORRECTING IRON CHLOROSIS IN PLANTS
Kenneth Russell Gray, Shelton, Wash., assignor to International Telephone and Telegraph Corporation, New York, N.Y.
No Drawing. Continuation of application Ser. No. 71,630, Sept. 11, 1970. This application Dec. 6, 1971, Ser. No. 205,305
Int. Cl. C05 9/02
U.S. Cl. 71—1
6 Claims

ABSTRACT OF THE DISCLOSURE

Processes are provided for the correction of iron chlorosis in plants. These processes comprise treating the plants with iron complexed red cedar wood extracts from the group consisting of potassium plicatate-iron complexes, complexes, sodium plicatate-iron complexes and mixtures thereof.

---

This application is a continuation of Ser. No. 71,630 filed Sept. 11, 1970 and now abandoned.

This invention relates to new and improved antichlorosis processes. More particularly, it relates to new and improved methods for correcting iron chlorosis in plants.

Chlorosis in plants is caused by a deficiency of certain chemical elements in the soil in which the plants are growing. The chlorosis can be corrected by supplying the deficient element or elements to the affected plants either through the roots by soil treatment or through the leaves by foliar spray treatment. However, it has been a continuing problem in the agricultural sciences to provide effective, efficient and economically advantageous means for correcting iron chlorosis in plants growing in iron-deficient soils. This problem is of major importance to those involved in agriculture since iron chlorosis causes progressively substandard crop yields and, in some cases, poorer quality crops. This reduction in yield and lowered quality product is a substantial economic disadvantage. The heretofore available methods and products which have been proposed for treatment of iron chlorosis have not solved this problem entirely.

Therefore, a definite need exists for iron furnishing antichlorosis agents which are effective for correcting chlorosis in plants either when applied to iron deficient soils as a solid or when applied directly to the leaves of the chlorotic plant as a foliar spray. In particular, it would be highly advantageous to provide iron furnishing soil treatment products and foliar sprays which are capable of supplying this element, in plant available form, to plants growing in soils having a wide spectrum of pH and composition values.

Accordingly, an object of the present invention is to provide new and improved agents for the correction of iron chlorosis. More particuarly, an object is to provide antichlorosis agents which are effective and efficient for correcting iron chlorosis in plants and which provide such correction of iron deficiency at an economically advantageous cost.

Another object is to provide antichlorosis agents which are effective for correcting iron chlorosis in plants when applied to the soil in which the plants are growing. A related object is to provide plant available iron for correcting chlorosis plants growing in iron deficient soils having a wide spectrum of pH and composition values.

A further object is to provide antichlorosis agents for correcting iron chlorosis in plants when applied to the foliage of the iron chlorotic plants. A related object is to provide antichlorosis agents which effectively and economically correct iron deficiency when applied to plants as foliar sprays and which are not toxic to the plants and do not discolor the foliage when applied thereto.

Additional objects if not specifically set forth herein will be readily apparent to those skilled in the art from the following detailed description of the invention.

Generally, the antichlorosis agents of the present invention comprise iron chelated compositions which may be employed effectively for either soil treatment or for foliar treatment of chlorotic plants. Foliar applications are of particular advantage with iron chlorotic deciduous fruit and nut trees which have deep root systems. The iron chelated compositions comprise iron complexed red cedar wood extracts, and, more particuarly, iron complexed potassium and sodium plicatates.

The compositions of the present invention exhibit excellent antichlorosis properties in soil applications as sources of plant available iron for a wide variety of plants growing in calcareous alkaline soils. Furthermore, the compositions have been found to be very effective in applications to the foliage of deciduous fruit trees such as pears, peaches, and the like and to vegetable and field crops such as sorghum, beans (e.g., soybeans), tomatoes, potatoes, corn, strawberries and the like.

More specifically, I have found that potassium and sodium plicatate-iron complexes are very effective agents for the correction of iron chlorosis in a broad spectrum of plants. In addition to the improved effectiveness of the instant complexes in correcting chlorosis, they have an added advantage over previously suggested products in that these potassium and sodium plicatate-iron complexes do not stain or discolor the leaves or fruit of the plants when applied as foliar sprays. This non-staining feature is of significant importance to home gardeners, nursery operators, commercial fruit growers, and the like, from the standpoint of providing more attractive and commercially acceptable products and plants.

Typically, the complexes of the instant invention are prepared by extracting red cedar wood sawdust at 100° C. for 15 minutes. Then, the extract is neutralized to a pH of about 5.5 with potassium or sodium hydroxide and evaporated to a solids content of about 13.8 percent total solids. Polyphenolics are removed from this solution, for example, by counter-current extraction in a rotating disc column, with an equal volume of methyl ethyl ketone. Residual methyl ethyl ketone is then stripped from the aqueous plicatate eluate, for example, by evaporation under vacuum, and the eluate solution concentrated to about 18.4 percent potassium or sodium plicatate content. A suitable amount of ferrous sulfate is then dissolved in the aqueous plicatate solution and the solution spray dried. The resulting product is a water-soluble, powdered potassium or sodium plicatate-iron complex normally containing about 10 percent plant available iron.

When the plicatate-iron complexes are employed for the correction of iron chlorosis in plants, it is usually advantageous to utilize a complex having an iron content of about 10 percent (based on the total weight of the product). However, it should be clear that the iron content of suitable products is variable over a broad range depending upon the particular application techniques employed, concentration of product to be employed, the particular plants treated and like factors.

Preferably, the foliar spray is formed by use of about 10 pounds of potassium or sodium plicatate-iron complex having an iron content of about 10 percent by weight (moisture content about 5 percent) to form 100 gallons of spray solution which is equivalent, on a weight basis, to a concentration of about 1.2 percent of the complex. Because of economic considerations, solution concentrations greater than about 20 pounds of the complex (10 percent iron content) per 100 gallons of spray solution are usually not desirable. Moreover, if the spray is too concentrated adverse effects may be obtained on the chlorotic plants. Normally, therefore, concentrations of the potassium and sodium plicatate-iron complex will not exceed about 30 pounds per 100 gallons. On the other hand, a concentration of less than about 5 pounds of the potassium or sodium plicatate-iron complex per 100 gallons of spray solution generally will not give a worthwhile correction of iron chlorosis in iron chlorotic plants.

As with other types of foliar sprays, it may be desirable to add a small amount of a wetting agent or spreader to the spray in order to achieve satisfactory distribution of spray on the leaves. In order to avoid possible damage to fruit by use of excess spreader, only enough spreader should be employed to achieve satisfactory spray distribution. A suitable spreader for use in the sprays of this invention is sodium dioctyl sulfosuccinate, commercially available under the trade name, Vatsol OT or Aerosol OT. A suitable concentration of the sodium dioctyl sulfosuccinate is about 0.01% (solids basis) based on the weight of the spray solution.

Generally, the foliar sprays of the present invention should be applied to a plant about about 3 to 4 weeks after the plant blooms, repeating about 2 to 3 weeks later if necessary. Normally, it is not desirable to spray the plant while it is dormant or immediately after it blooms. Ideally, spraying with the sprays of the present invention is conducted at a time when most of the leaves of the plant have formed and are still growing. The results of foliar treatment with the antichlorosis agents of the present invention are soon noticeable after treatment by a change in color of the foliage from sickly yellowish green to a healthy normal dark green.

Heretofore, it has been a problem to provide an effective, ecomonical and non-staining foliar spray for the correction of iron chlorosis. Previously known sprays have often tended to permanently darken and stain the leaves and the fruit of the sprayed plants. From an aesthetic standpoint and, also from the standpoint of the consumer, such stained plants and fruit are unappealing. Furthermore, such discoloration of the fruit tends to cause accelerated ripening and, thus, to adversely affect the quality of the fruit by creating over-ripe spots therein. The instant foliar sprays employing potassium and sodium plicatate-iron complexes therein, have solved this long standing, troublesome problem of staining and discoloration since the residue, while dark colored, can be readily washed off the plant or fruit without discoloring or staining the same.

In soil applications of the potassium and sodium plicatate-iron complexes of the present invention, it has been found that substantial greening and correction of iron chlorosis in practically all types of iron chlorotic plants is achieved, and particularly with those plants growing in calcareous alkaline soils. As with the foliar sprays, it is preferred to employ a potassium or sodium plicatate-iron complex for soil treatment having about 10 percent iron content (based on the total weight of the product). However, the particular iron concentration to be employed is variable within a broad range depending on many factors.

For soil treatment in the prevention or correction of iron chlorosis in field crops, it is preferred to employ solid potassium or sodium plicatate-iron complexes having a moisture content of from about 4 to 10 percent while in powdered or granular form. Advantageously, the powdered or granular iron complex can be mixed with commercial fertilizer, and applied therewith, for greater ease in uniform distribution. In any case, the antichlorosis agent should be distributed in the soil, whether applied by itself or admixed with fertilizer, at a rate of from about 10 to 30 pounds per acre in order to supply at least 2 pounds or more per acre of plant available iron to the soil.

In applying the inventive antichlorosis agents to the soil, a technique should be used that will place the plant available iron in the area where the roots are formed. One commonly used technique is to till the antichlorosis agent into the soil, alone or admixed with commercial fertilizer, before the crop is planted. However, other techniques may be employed, depending on such factors as, for example, the particular tilling technique employed.

The following examples are set forth for the purpose of illustration only and are not intended to be construed as being limitative in any respect.

EXAMPLE I

Nine one-half gallon containers were prepared for the growth of sorghum using a Colorado soil (pH 8.2) known to be deficient in its ability to furnish iron to the plants.

Three of the containers in the series functioned as controls with only an NPK fertilizer being added to the soil thereof. The fertilizer was added to these controls by mixing it into a 100 gram soil layer located 2 inches below the final soil surface.

Iron complexed potassium plicatate having an iron content of 10.2 percent (based on the total weight of the iron complexed product) was applied to the soil of the other six containers. In three of these containers, the potassium plicatate-iron complex was applied in an amount equivalent to 10 pounds per acre. In the final three containers, the iron complex was applied in an amount equivalent to 30 pounds per acre. In each instance, the potassium plicatate-iron complex application was performed by mixing the product into a 100 gram soil layer located 2 inches below the final soil surface. An NPK fertilizer was also applied at this level in each of the containers.

The plants in each of the nine containers were observed throughout a 70 day growth period for iron deficiency symptoms. The observed results of this testing indicated that potassium plicatate-iron complexes are very effective in correcting iron deficiency when applied to the soil. Additionally, it was noted that the iron complexed product improved plant color and growth as compared with the control plants.

Thus, the results of this testing illustrate the effectiveness of the products of the present invention in correcting iron chlorosis in plants when applied to the soil in which the plants are grown.

EXAMPLE II

Three groups of one-half gallon containers were prepared for the growth of sorghum using a Colorado soil (pH 8.2) known to be deficient in its ability to furnish iron to the plants.

The soil in one group of containers was treated with a potassium plicatate-iron complex having an iron content of 8.9 percent (total weight basis), a second group was treated with a potassium plicatate-iron complex having an iron content of 10.2 percent (total weight basis) and the third group was untreated.

In some of the containers, the iron complexed product was added to the soil in a 100 gram layer 2 inches below the surface. In other containers, the product was added into all the soil 2 inches or more below the soil surface. In all cases, the iron complexed product was applied to the soil at a rate equivalent to 30 pounds per acre.

The plants in each of the containers were observed throughout a 70 day growth period for iron deficiency symptoms. Such observations indicated that potassium plicatate-iron complexes are effective antichlorosis agents at varying iron concentration levels. Also, this test showed that placement of the iron complexed products in the soil at different levels did not adversely affect the performance of the products in correcting chlorosis.

EXAMPLE III

Greenhouse culture studies were conducted employing Texas soil lacking in available iron. A series of half-gallon containers were prepared with the Texas soil (pH 8.3) for the growth of sorghum plants. During the soil preparation process, a potassium plicatate-iron complex was applied to the soil of triplicate containers in amounts equivalent to 10, 20 and 30 lbs. per acre. The iron complexed product, as well as a supplemental NPK fertilizer, was added in each case to the 100 grams of soil located 2 inches below the final soil surface. Controls with no iron complex added to the soil were also prepared in triplicate.

The containers were planted to Martin "B" line sorghum and observations were made throughout the 46 day experimental period for plant symptoms indicating an iron deficiency.

It was determined from this testing that substantially greater correction of iron chlorosis was obtained in the potassium plicatate-iron complex treated plants than with the control plants. Maximum correction of iron deficiency was obtained employing an amount of iron complex equivalent to 30 lbs. per acre, although effective correction of chlorosis was achieved with the lower application levels.

EXAMPLE IV

Starting at the time of blossom petal drop and continuing from then on at two week intervals for a period of 8 weeks, potassium plicatate-iron complex foliar sprays were applied to the fruit of peach trees (var. Collins yellow). This operation consisted of hand spraying all the fruit on individually tagged branches.

The iron complex spray formulations applied to the fruit on these individual branches at each of the sprayings comprised aqueous solutions of a potassium plicatate-iron complex having an iron content of 8.9% (total weight basis) diluted in a ratio of 10 lbs. iron complex per 100 gallons of solution.

At maturity, the fruit was harvested and inspected to determine the condition of the fruit and particularly to ascertain whether the fruit was discolored or damaged by the spraying.

Inspection of the fruit at harvest showed that no discoloration or damage occurred from treatment of the fruit with iron complexed potassium plicatate. It is to be noted that this result is highly significant since fruit discoloration and/or damage which has been known to result from foliar application of previous iron sources to fruit trees has been a continuing problem to fruit growers. Heretofore, discoloration has stemmed from the depositing of dark spray residue on the fruit surface which is readily visible. Indirectly, this residue has caused damage to the fruit since it accelerates the rate of ripening below the area where it is deposited due to increased heat absorption. In the case of hard fruits such as apples, and the like, it has been possible to remove this residue deposit by washing and scrubbing the fruit after harvesting. However, it will be apparent that such procedures are inefficient, time consuming and economically disadvantageous. Furthermore, for soft fruits such as peaches and the like, it is not advisable to subject them to washing prior to marketing; and scrubbing the fruit could very possibly severely damage the fruit.

Thus, any discoloration due to residue deposit would affect the appearance and quality of the fruit and would substantially reduce the value thereof.

Since the spraying technique employed in the present testing was directed toward placing the potassium plicatate-iron complex spray solution directly on the fruit, the amount of spray deposited thereon very likely exceeded that which would contact the fruit under normal conditions of a commercial spray application. Nonetheless, the potassium plicatate-iron complex foliar sprays of the present invention did not cause discoloration of the fruit.

EXAMPLE V

Seeds of a Lovell variety of peach were stratified to break the dormant stage and the seedlings obtained planted in 8-inch planter pots containing two kilograms of calcareous California soil. The seedlings were fertilized with a nutrient solution and then maintained with daily watering in a controlled environment chamber. The illumination cycle in this chamber consisted of 14 hours at 1500 ft. candles at 85° F. followed by 10 hours of darkness at 65° F. Chlorotic leaves which were eventually obtained were used for the following experiment.

Leaves of a seedling suffering from chlorosis were sprayed with a water solution containing 10 lbs. of a potassium plicatate-iron complex having an iron content of 10.2% (total weight basis) and 0.01% of a spreader (Aerosol "OT") per 100 gallons. The plant was then maintained in the environment chamber for two weeks, resprayed and returned to the chamber for one month. A treated leaf was then removed, washed and examined. The results of this testing showed that substantial correction of iron-chlorosis in the plants was achieved employing the foliar prays of the present invention.

EXAMPLE VI

Iron-chlorotic leaves of a Bartlett pear tree growing in a calcareous Arizona soil were sprayed with a water solution containing 10 lbs. of a potassium plicatate-iron complex having an iron content of 10.2% (total weight basis) and 0.01% spreader (Aerosol "OT") per 100 gallons. The plant was then maintained in the environment chamber for approximately two weeks, the sprayed leaves removed, washed and examined. The results of this testing showed that substantial correction of iron-chlorosis in the plants was obtained, employing the inventive foliar sprays.

While the principles of the invention have been described above in connection with specific products and applications, it is to be understood that this description is made only by way of example and not as a limitation on the scope of the invention.

I claim:

1. A method for correcting iron chlorosis in plants comprising treating said plants with an iron complexed red cedar wood extract composition selected from the group consisting of potassium plicatate-iron complexes, sodium plicatate-iron complexes and mixtures thereof.

2. The method of claim 1 wherein the iron content of said potassium and sodium plicatate-iron complexes is about 10 percent (based on the total weight of the product).

3. The method of claim 1 wherein said composition for treating said plants is a non-staining foliar spray composition comprising a solution containing an iron complexed product selected from the group consisting of iron complexed potassium plicatate, iron complexed sodium plicatate and mixtures thereof.

4. The method of claim 1 wherein said composition for treating said plants is an iron complexed product selected from the group consisting of iron complexed potassium plicatate, iron complexed sodium plicatate and mixtures thereof, and wherein said composition is applied to the soil in which said plants are growing.

5. A method for correcting iron chlorosis in plants comprising applying to the foliage of said plant an effective amount of a solution containing an iron complexed product selected from the group consisting of iron complexed potassium plicatate, iron complexed sodium plicatate and mixtures thereof.

6. A method for correcting iron chlorosis in plants comprising applying to the soil in which said plants are growing an effective amount of an iron complexed product selected from the group consisting of iron complexed potassium plicatate, iron complexed sodium plicatate and mixtures thereof.

References Cited
UNITED STATES PATENTS 3,270,003  8/1966  Van Blairkom et al. ___ 71—1 X REUBEN FRIEDMAN, Primary Examiner R. BARNES, Assistant Examiner